Aug. 23, 1932.  H. GORANSON ET AL  1,872,732
FRUIT PEELING MACHINE
Filed May 29, 1929  4 Sheets-Sheet 1

Inventor
Hjalmar Goranson
David Goranson
By Lyon & Lyon
Attorneys

Aug. 23, 1932.  H. GORANSON ET AL  1,872,732
FRUIT PEELING MACHINE
Filed May 29, 1929   4 Sheets-Sheet 2

Fig. 2.

Inventor
Hjalmar Goranson
David Goranson
By Lyon & Lyon
Attorneys

Aug. 23, 1932.  H. GORANSON ET AL  1,872,732
FRUIT PEELING MACHINE
Filed May 29, 1929   4 Sheets-Sheet 3

Inventor
Hjalmar Goranson
David Goranson
By Lyon & Lyon
Attorneys

Fig. 5.

Patented Aug. 23, 1932

1,872,732

UNITED STATES PATENT OFFICE

HJALMAR GORANSON AND DAVID GORANSON, OF SUNNYVALE, CALIFORNIA, ASSIGNORS TO CALIFORNIA PACKING CORPORATION, OF SAN FRANCISCO, CALIFORNIA, A CORPORATION OF NEW YORK

FRUIT PEELING MACHINE

Application filed May 29, 1929. Serial No. 366,790.

This invention relates to fruit peeling machines in which the automatic peeling operation may be supplemented by certain hand operations.

Machines for automatically peeling fruit have been constructed in the form of a rotary table carrying a number of peeling mechanisms which, as the rotary table rotates, effect the peeling of the fruit. In other words, a number of different peeling units are provided which, as the rotary table rotates, are all in different stages in the peeling operation. Such machines are relatively heavy and complicated, and if any part of the machine must be repaired, this necessitates the stopping of the machine, throwing out of use all of the peeling units.

The general object of this invention is to produce a peeling machine of a unitary type which is of simple construction but which will operate effectively and quickly to remove the peeling of the fruit. While the machine may be adapted for peeling fruit of any kind, it is particularly useful in peeling pears.

A further object of the invention is to provide an improved general construction for machines of this type.

In its preferred form the machine includes one or more peeling cutters that are held against the face of the fruit, there being a relative rotation between the fruit and the cutter on the axis of the fruit. One of the objects of the invention is to provide an improved mounting for supporting the cutters with relation to the fruit as the fruit is advanced past the cutters. In other words, one of the objects of the invention is to provide an improved cutter frame with improved means for controlling its position to regulate the relation of the cutter to the fruit.

A further object of the invention is to provide a simple construction for the machine which will enable it to perform the peeling operation on the fruit and then stop automatically when the peeling operation is completed; also to provide such a machine with simple means for re-starting the machine to perform the peeling operation on another fruit.

A further object of the invention is to improve the construction of the peeling cutter and particularly to provide an auxiliary knife co-operating with the cutter to remove protuberances on the face of the fruit in advance of the peeling knife or blade.

Further objects of the invention will appear hereinafter.

The invention consists in the novel parts and combination of parts to be described hereinafter, all of which contribute to produce an efficient fruit peeling machine.

A preferred embodiment of the invention is described in the following specification, while the broad scope of the invention is pointed out in the appended claims.

Figures 1, 3:
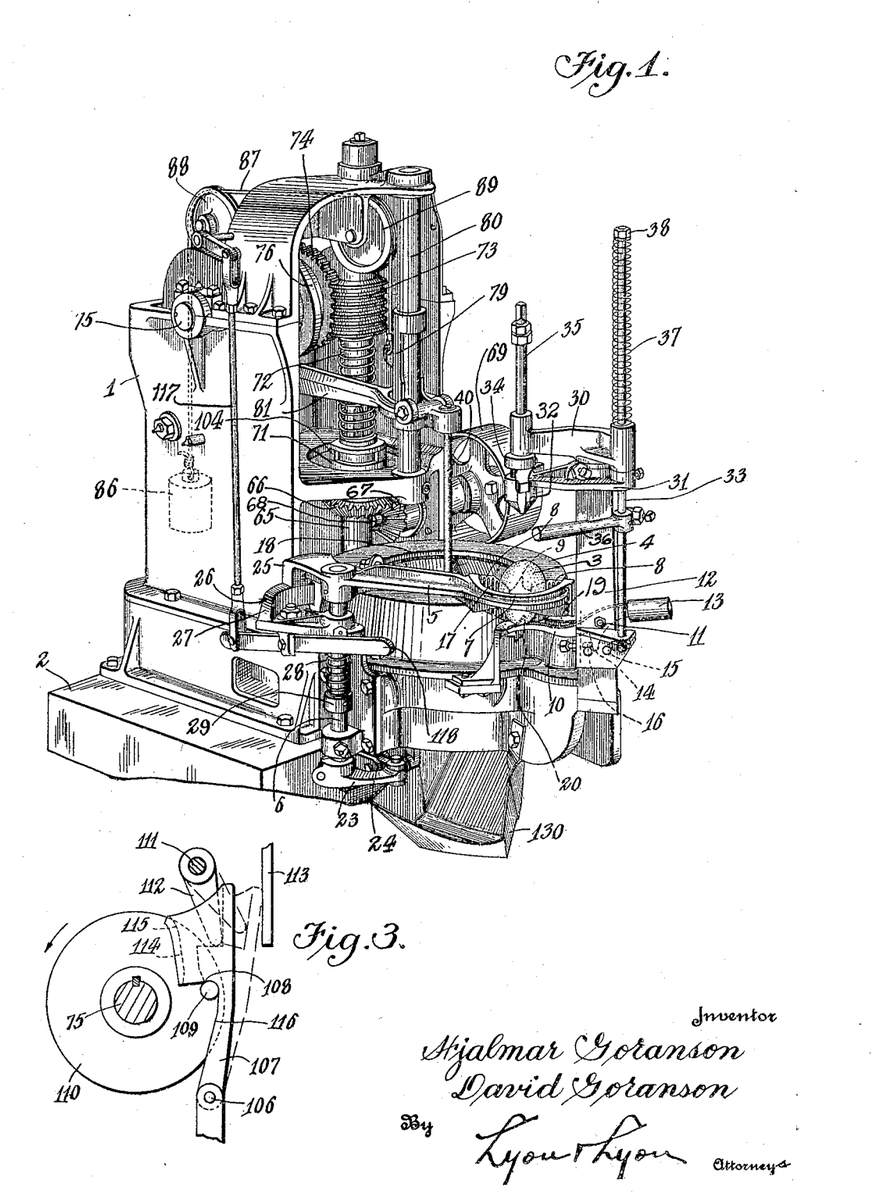
Figure 1 is a perspective of a machine embodying our invention and illustrating a pear set in the fruit holder in its receiving position and ready to be swung over and into line with the peeling mechanism of the machine.
Figure 3 is a vertical section taken about in the plane of the line 3—3 of Figure 2, and particularly illustrating the trip mechanism for pulling open the clutch of the machine automatically.
Figure 2:
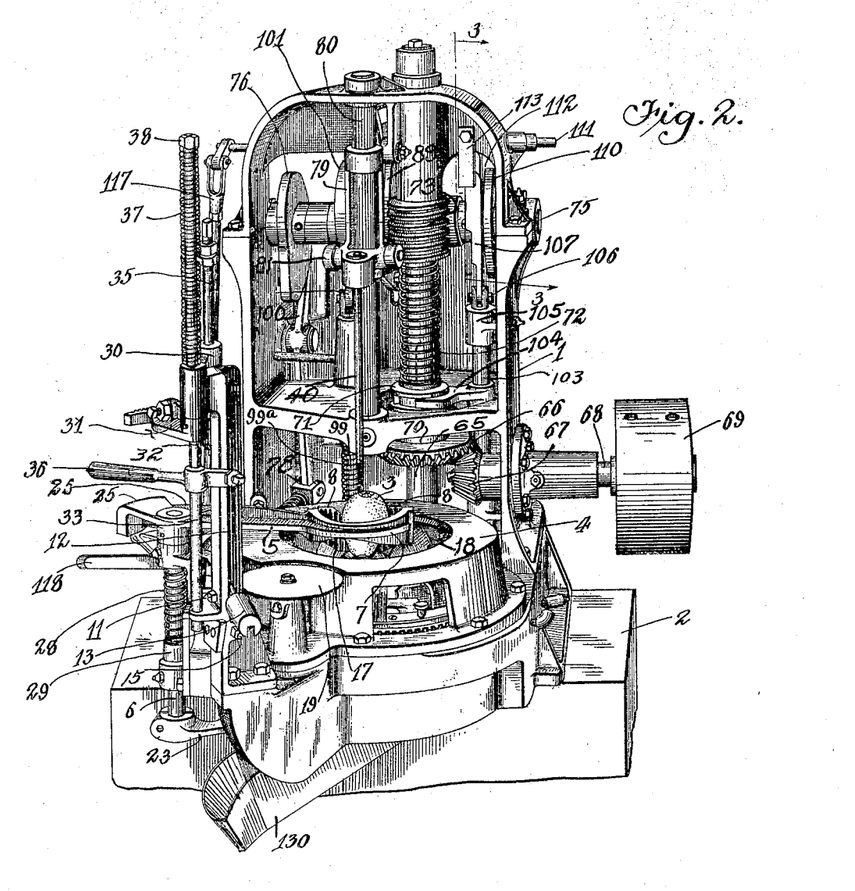
Figure 2 is also a perspective, illustrating the machine viewed from another angle, and more clearly illustrating the cam-shaft and actuating cams and also the means for opening the clutch automatically at the completion of the cycle of the machine.

Referring particularly to Figures 1 and 2, the machine comprises a frame 1 in the form of an upright housing adapted to be supported on a table or bench 2. This housing is open on its front side and its lower portion extends forwardly from the bench so as to enable the machine to be conveniently controlled by an operator. The machine is constructed so that the fruit, for example, a pear 3, is placed in a fruit holder which is capable of assuming a receiving position such as illustrated in Figure 1. After the fruit is put in position it is swung inwardly so that its axis is in alignment with the peeling mechanism enclosed in a circular housing or cover 4, after which the machine operates to advance the fruit automatically through the peeling mechanism.

While the features of novelty in this machine could be incorporated in a machine in which the fruit is held on a horizontal axis, in the present specification the invention is described as applied to a machine in which the fruit is held with its axis in a vertical position when being peeled. The holder for the fruit is in the form of a swinging frame constructed as an arm 5 attached to a vertical shaft 6 rotatable on its vertical axis and supported in suitable bearings at the side of the machine. The end of the holder arm 5 has a semi-circular head 7, the opening of which operates as a receiving throat for the fruit. When the fruit is put in place, it is shoved down by a vertical movement along the axis of this throat so that the fruit is engaged by impaling blades projecting into the throat. In the present instance we prefer to provide two such impaling blades 8 which are diametrically opposite to each other and which project in from opposite sides of the semi-circular head 7.

These impaling blades 8 are in the same vertical plane and are constructed so that they project toward each other, their inner edges 9 being disposed slightly apart so that they do not extend into the fruit sufficiently to halve it.

When the fruit is put in place, its downward movement is limited by a rest 10 in the form of a lever pivotally mounted at 11 on a frame member 12, the tail of this lever being provided with a counter-weight 13. This lever has a downwardly projecting toe 14 that may come against an adjustable stop 15 to limit the downward movement of the rest when shoved down by the fruit. A similar adjustable stop 16 may be provided to cooperate with the toe 14 and limit the upward movement of this rest. These two stops enable the position of the rest to be nicely adjusted with respect to the impaling blades 8. These impaling blades are provided with vertical parallel corrugations 17 which have been disclosed in our former application, Serial Number 302,042, filed August 25, 1928, for Fruit peeling machine, and which operate to assist in guiding the fruit and increase the holding power of the impaling blades on the fruit.

After the fruit is set in place as illustrated in Figure 1, the swinging frame 5 is swung out over the center of the cover or housing 4 so as to come over the center of a large opening 18 that is formed through the top plate of this cover. As the fruit swings inwardly, its lower end passes across a cutter in the form of a rotary disc 19 (see Figure 2) which severs the stem end of the fruit. This cutter 19 is continuously driven by means described hereinafter.

Figure 5:
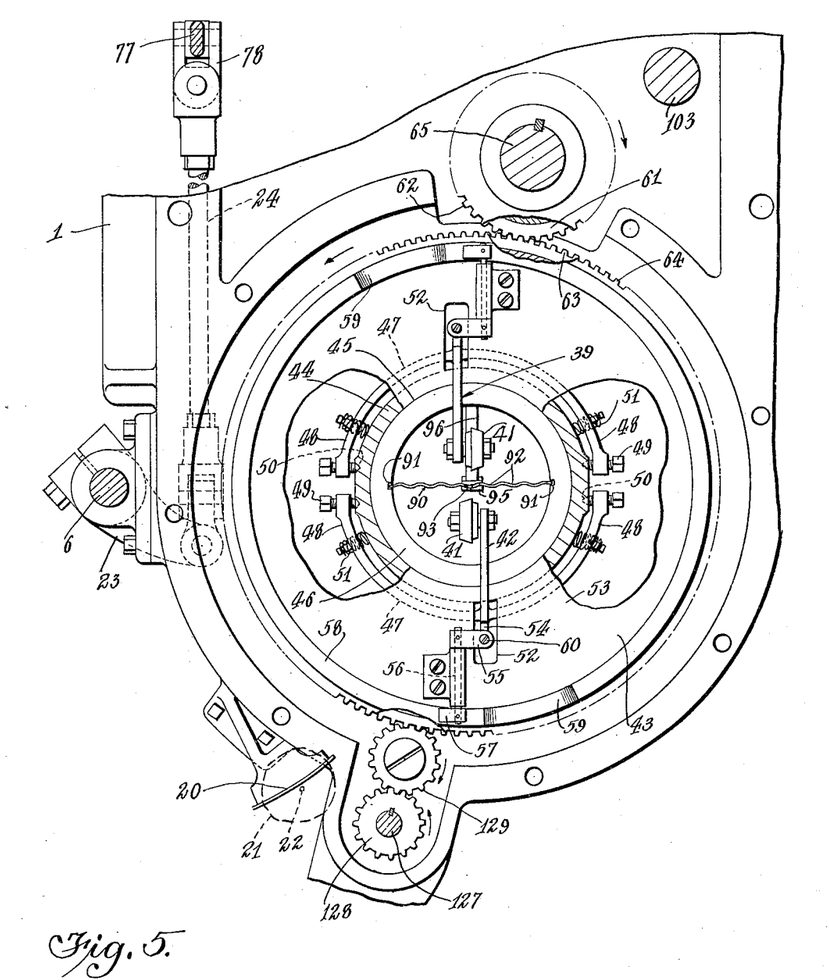
Figure 5 is a plan of the lower portion of the mechanism, certain parts being broken away and shown in section. This view particularly illustrates details of the peeling mechanism and further illustrates details of the means for effecting the severing of the stem end of the fruit as it is swung over into alignment with the peeling mechanism.

We provide means for steadying the fruit as it engages this cutter 19. The cutter is in a horizontal position and is at substantially the same level as the top of the housing or cover 4. In order to steady the fruit 3 as it swings toward the center of the opening 18, we provide an arcuate blade 20 (see Figure 5) which is curved about the axis of the vertical shaft 6 on which the fruit holder 5 swings. In Figure 5 the dotted line 21 indicates the outline of a pear and shows its relation to the blade 20, indicating the stem 22 of the pear on the outer or convex side of the blade 20. When the pear is set in the holder the upper edge of this blade 20 cuts into the underside of the fruit near the stem. The upper edge of this blade is horizontal.

After the pear has moved across the cutter 19 and as soon as it has moved out into the opening 18, the arm 5 becomes depressed automatically so as to support the fruit in a depressed position in the opening 18. The inward swinging movement of the arm 5 may be accomplished by hand, if desired, but in the machine illustrated this movement is accomplished through the medium of an arm 23 (see Figure 1) secured to the lower end of the rock-shaft 6 and actuated by a link 24 operated off of the cam-shaft of the machine.

The swinging frame 5 has a tail arm in the form of a segment 25 which is supported on a cam 26 fixed to the frame of the machine. As the arm 5 swings, the segment 25 runs down on the depressed portion 27 of this cam and permits the fruit holder to descend into the opening. Although gravity might be sufficient to insure the segment 25 following the cam properly, in order to make this certain the shaft 6 is provided with a spring 28 thrusting downwardly against a fixed collar 29 on the rock-shaft 6.

Figure 2 shows the holder and fruit in position ready for the fruit to be peeled.

Before the fruit is swung out into the peeling position, we prefer to cut out the flower end of the fruit by mechanism forming the subject matter of another application for Letters Patent of the United States. For this purpose we provide a hand-operated device which has a cutter that can be advanced to engage the flower end of the fruit and which can be rotated by means of the same lever that advances it. This gouging cutter is preferably mounted in such a way that it will be automatically withdrawn by a spring when its operating handle is released. The preferred construction for this purpose includes a guide frame 30 fixed to the frame of the machine and having means for guiding a cross-head 31, which cross-head is preferably in the form of a segment which, when it descends, carries down with it the gouging cutter 32. For this purpose the segment 31 is rigidly secured to a vertical slide bar 33 that is guided to slide through one end of the guide frame 30. The arc of the segment or cross-head 31 runs in the groove of a collar 34 on the lower end of a sliding spindle 35 that is also guided to slide vertically and located at the other end of the guide frame. The slide bar 33 carries a rigid operating lever 36. The gouging tool 32 is substantially in line with the axis of the pear 3 when the pear is placed in the holder in the receiving position. The slide bar 33 is normally held in an elevated position by means of a coil spring 37 disposed around its upper end thrusting against a nut 38 on the upper end of the slide bar and supported on the upper side of the guide frame 30.

By seizing the lever 36, the operator can slide the spindle 35 down till the gouging cutter 32 engages the pear. A slight swinging movement of the lever 36 will rotate the slide bar 33 on its axis and impart rotary movement to the spindle 35 to gouge the upper end of the pear. When the operator releases the lever 36, the spring 37 will withdraw the gouging cutter 32 and the cross-head 31 from the vicinity of the fruit.

Figure 4:
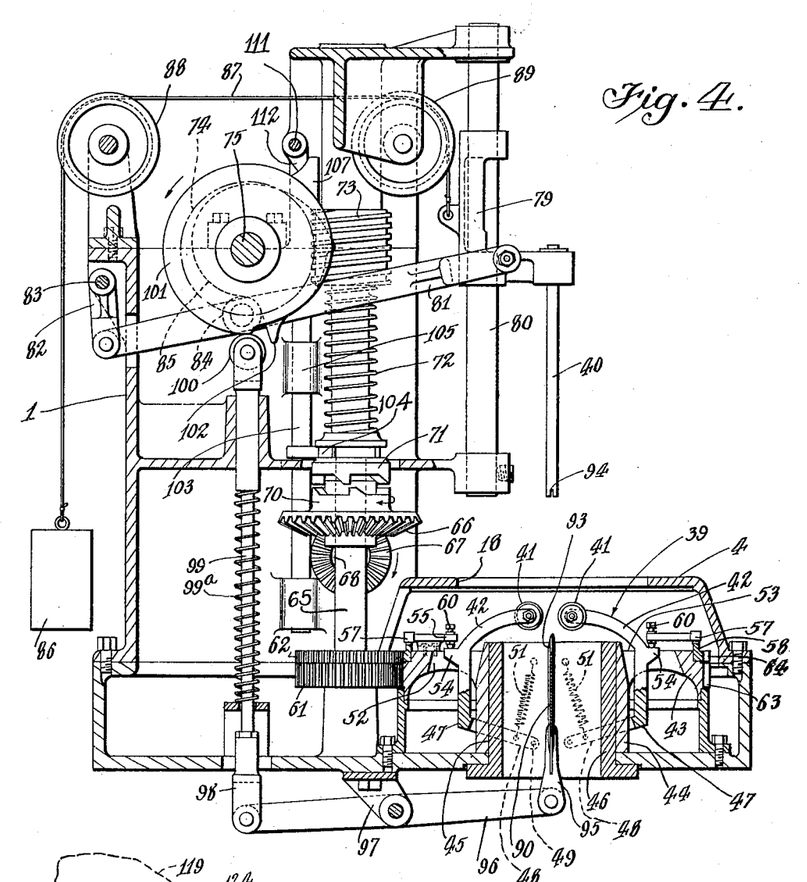
Figure 4 is a vertical section through the machine taken on and near the central vertical axis of the machine and further illustrating the general arrangement of the driving mechanism and the peeling mechanism.
Figure 6:
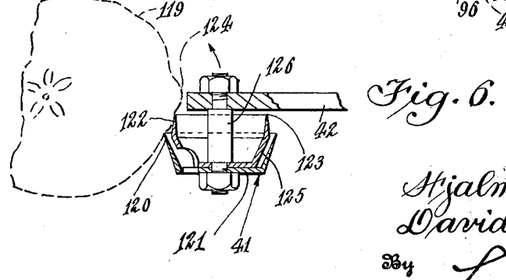
Figure 6 is a detail view of one of the peeling cutters and is a section through one of the cutters. This view particularly illustrates an improved peeling cutter having means associated with it for smoothing the face of the fruit in advance of the peeling knife.

Referring to Figure 4, after the fruit holder 5 is swung inwardly, the axis of the fruit comes into line with the axis of the peeling mechanism 39 (see Figure 4), being located directly under a pusher stem 40 which is automatically operated by the machine to descend and force the pear down past the peeling cutter or cutters 41. One of these cutters is illustrated in detail in Figure 6 and will be described later more in detail.

Each cutter is mounted on a frame 42. In the present instance we provide two of these frames to support two diametrically oppositely disposed cutters. The cutter frames are supported on axes of rotation which extend transversely to the longitudinal axis of a rotary carriage 43 that supports the cutter frames. This carriage has a central hub 44 mounted to rotate about the vertical axis and having a large central opening 45 through which the fruit passes during the peeling operation. In order to provide an adequate bearing for this hub 44, we prefer to provide the frame with a fixed bushing or inner sleeve 46.

Referring to Figure 5 in connection with Figure 4, it will be seen that the lower portion of each cutter frame is formed into a curved yoke 47 having two arms or prongs 48 that extend around to diametrically opposite points, the ends of the arms being provided with adjustable gudgeons 49 that are rotatably received in conical sockets 50.

The cutter frames are provided with means for yieldingly urging them in a direction to press the cutters 41 toward the fruit. Springs are employed for this purpose and in the present instance there is a coil spring 51 (see Figure 4) corresponding to each arm 48, the upper end of the spring being anchored near the upper end of the hub 44.

The upper portions of the cutter frames 42 extend up through two diametrically opposite slots 52 formed in the top plate 53 of the rotary carriage.

We provide automatic and variable means for controlling the limit of movement of the cutters 41 toward the fruit. This enables us to control the position of the cutters where this is desirable to enable the cutters to follow the contour or vertical profile of the fruit as the fruit descends between the cutters. For this purpose each cutter frame 42 is provided with a toe 54 which is engaged by a short arm 55 on a radial rock-shaft 56, said rock-shaft having a short controlling arm 57 that runs on a ring-shaped cam 58. This ring-shaped cam is of the type disclosed in our application Serial Number 302,042, filed August 25, 1928, and is concentrically mounted on the axis of the rotary carriage but driven at a different speed than the carriage. This enables us to employ cam surfaces 59 on the upper side of this ring to cause movements in the short arm 55 to control the position of the cutter frames.

In order to provide for adjustment, the point of contact between the arms 55 and toes 54 preferably includes an adjusting screw 60 (see Figure 4).

It should be understood that in this machine the fruit is held relatively fixed and the cutters 41 rotate around the axis of the fruit which is located on the axis of rotation of the carriage 43. In order to rotate the carriage and the cam 58, two pinions 61 and 62 are provided which engage with gear teeth 63 and 64 formed around the edge of the carriage and the edge of the cam. These teeth 63 may be made integral with the carriage. The cam 58, therefore, constitutes a large ring gear and so does the carriage 43. The pitch diameter for the teeth 64 and the teeth 63 is the same, so that if these two parts were driven by pinions of the same diameter they would rotate at the same speed. However, we make the pinions 61 and 62 of slightly different diameter by giving one of the pinions a few more teeth than the other, and in this way we drive the cam 58 at a different speed than the carriage. The different speed of rotation enables the cam faces 59 to be utilized to produce the desired movements in the cutter frames.

The pinions 61 and 62 are mounted on a vertical shaft 65 and this shaft carries a loose bevel gear 66 which is continuously driven in the direction indicated (see Figure 4) by a bevel gear 67 on a pulley shaft 68 driven by a belt passing over a pulley 69 (see Figure 2).

The machine is provided with a clutch that opens automatically when the machine has passed through one cycle of movement. For this purpose the hub of the bevel gear 66 is formed into a clutch member 70 with driving dogs to engage with similar dogs on a clutch member 71 in the form of a sliding collar splined on the shaft 65 above the pinion 66 and pressed downwardly by a coil spring 72 disposed around the shaft above the collar. Evidently this spring will hold the clutch closed unless the collar clutch member 71 is held away from the clutch member 70. The means for throwing this clutch open automatically will be described later.

Near its upper end the vertical shaft 65 is formed with a worm 73 that drives a worm wheel 74 on a horizontal cam-shaft 75 mounted in the upper part of the frame. This cam-shaft is provided with a cam 76 (see Figure 2) that operates a bell-crank lever 77, the lower end of which is attached by a knuckle joint 78 to the rear end of the link 24 already described. This enables the cam 76 to actuate the arm 24 and the shaft 6 (see Figure 1).

The cam-shaft 75 is also provided with means for actuating the pusher stem 40 to push the fruit down past the peeling cutters 41. For this purpose the upper end of the stem 40 is attached to a slide or carriage 79 (see Figure 4) that is guided in a vertical plane by means of a guide bar 80 fixed in the forward part of the frame of the machine. This carriage 79 is attached to the forked end of a cam lever 81 the rear end of which is pivotally attached to a link 82 the upper end of which is secured to a fixed pivot 83 on the frame.

The cam lever 81 is provided with a roller 84 rolling on a cam 85 on the cam-shaft. The carriage 79 is held up so as to hold the roller 84 on the cam 85 by means of a counter-weight 86 (see Figure 4) that is supported on a cord or wire 87 attached to the back of the carriage and passing around elevated pulleys 88 and 89 mounted on the frame.

When the fruit holder 5 is swung out into the position illustrated in Figure 2, with the fruit 3 located on the central axis of the carriage, the impaling blades 8 will lie in the same plane with a guide blade 90 (see Figure 4) that is located in the opening through the carriage 43. In the present instance this blade 90 is mounted with its side edges guided in oppositely disposed guide grooves 91 formed in the wall of the tubular bushing or arbor 46 (see Figure 5). The blade 90 will have substantially the construction of the corresponding blade illustrated in our former applications and is provided with corrugations 92 in a vertical plane. It also is provided at its upper edge with a deep V-shaped or U-shaped notch 93, as disclosed in our former application. The bottom of the V-notch 93 is on the axis of the stem 40 and the lower end of the stem 40 is provided with a notch 94 which provides clearance enabling the stem 40 to have a further downward movement than it would otherwise have. The bottom of this notch is sharpened to a cutting edge to enable it to split the core when the fruit passes down.

Near the end of the peeling operation, it is necessary to provide for depressing the plate 90 to enable it to carry the fruit down with it. This is done to enable the peeling cutters 41 to remove the peel on the flower end of the fruit. In order to accomplish this, the lower end of the blade 90 is attached by a knuckle 95 to a lever 96 pivotally supported on a fixed bracket 97 and having its other end connected by a knuckle 98 to a push rod 99. This push rod is guided in the frame and its upper end has a roller 100 rolling on a cam 101 carried on the cam-shaft 75.

Referring again to the cam 85, attention is called to the projecting toe 102 formed on this cam. This toe gives the lever 81 a sudden downward movement after the peeling operation is completed, which forces the fruit down past the knife or blade 90 and completely severs the core of the fruit by the knife so that the blade or knife 90 divides the fruit into two halves which fall down into a guide chute to receive the halves of the fruit and direct the same to one side.

In order to enable the machine to open the clutch 70—71 automatically at the end of each complete revolution of the cam-shaft 75, we provide a pull rod 103 (see Figure 4) the lower end of which is provided with a yoke 104 engaging with the sliding collar 71 so as to pull the clutch open. This pull rod 103 is guided at its upper end to slide through a guide sleeve 105 formed on the frame (see Figure 4) and above this point it is pivotally attached by a pin 106 (see Figure 3) to a trip arm 107. This trip arm 107 has a shoulder 108 that projects toward the cam-shaft 75 and lies in the path of a pin 109 projecting laterally from the side face of a disc 110 secured on the cam-shaft.

The direction of rotation of the cam-shaft is that indicated by the arrow, so that when the pin 109 is rising and at about the height of the shaft 75, it engages this shoulder 108 and pulls the clutch open, thereby stopping the machine. We provide hand-controlled means for throwing this trip arm 107 into a position which will permit the clutch to close by its spring 72, thereby starting the machine. For this purpose we provide a rock-shaft 111 carrying a short arm or toe 112 the end of which rests against the upper end of the trip lever 107 on the side toward the cam-shaft. By rocking the rock-shaft 111 in an anti-clockwise direction, the arm 112 can swing the trip arm over against the fixed stop plate 113 secured in the frame. This will move the shoulder 108 out of line with the pin and bring a guide channel 114 formed on the trip lever into alignment with the pin. This guide channel 114 will then permit the pin 109 to pass. The channel 114 is constructed so that one side of it is formed with a cam face 115 that co-operates with the pin to return the trip lever 107 to its active position with the shoulder 108 in the path of the pin, or so that the inner face or edge 116 of the trip lever will be engaged by the pin.

The rock-shaft 111 is manually controlled (see Figure 1) through the agency of a link 117 (see Figure 1) the lower end of which is attached to a hand lever 118 at one side of the machine.

The peeling cutters 41 are preferably provided with means for cutting protuberances on the surface of the fruit in advance of the cutting edge that removes the peel. This tends to produce uniformity in the peeled fruit, even if the contour of the fruit is somewhat irregular, as illustrated by the dotted line 119 (see Figure 6). Each peeling cutter is formed with a peeling knife or blade 120 which is a curved blade, and preferably the cutting edge is formed as a circumferential edge at the large end of a frustum 121 of a cone, the small end of the cone being attached to the arm 42 of the cutter frame. This peeling blade at the cutting point (see Figure 6) is disposed at a considerable inclination to the face of the fruit so that it operates more or less as a scraper as well as a peeling knife. The relative rotation of the fruit and the knife being that indicated by the arrow, it will be noted that we provide a cutter 122 that operates on the fruit in advance of the knife 120. This cutter is also preferably provided with a circumferential cutting edge 123 that is formed in such a way that at the point of application of the cutting edge, the cutting edge lies nearly flat against the face of the fruit and operates to cut off any protuberances such as indicated at 124. This knife 122 may be formed at the large end of a frustum 125 of a cone which is received inside of the frustum 121, both knives being secured to a pivot bolt 126 in the end of the arm 42. The cutters are tight on this pivot bolt and are provided with openings as indicated to pass out the peel or projections cut off by the knives.

Any suitable means may be employed for driving the disc cutter 19 that cuts off the stem end of the fruit. For this purpose the cutter 19 may be attached to a vertical shaft 127 (see Figure 5) having a rigid pinion 128 driven by an idle pinion 129 off of the teeth 63 or 64 of the carriage 43 or the cam 58.

We will now describe briefly the general mode of operation of the machine. With the fruit holder 5 in the position illustrated in Figure 1, the fruit 3 is shoved down on the impaling knives 8 until its downward movement is stopped by the adjustable rest 10. In placing the fruit, such as a pear, in this holder, the stem 22 of the pear should be located on the convex side of the curved knife 20 (see Figure 5). The operator of the machine then seizes the handle 36 and pulls it down. This operation brings the cutter head 32 into engagement with the flower end of the fruit and as this occurs the operator swings the lever 36 in both directions, thereby actuating the segment cross-head 32. Having cut out the flower end of the fruit, the operator releases the lever 36 and the coil spring 37 then pulls up on the slide bar 33, thereby returning the cutter 32 to its elevated position. The operator then depresses lever 118 which operates through link 117 to actuate rock-shaft 111. This movement operates the short arm 112 (see Figure 3) and rocks the trip lever 107 toward the right so as to remove the shoulder 108 from the path of the pin 109 on the disc 110 which is rigid with the cam-shaft 75. This permits the cam-shaft 75 to rotate through one complete revolution. At the end of the revolution, the pin 109 strikes the shoulder 108 and pulls the draw rod 103 in a direction to open the clutch 70—71.

When the movement of the trip lever 107 liberates it from the pin 109, of course the clutch spring 72 closes the clutch by permitting the splined collar 71 to engage the clutch member 70 on the hub of the bevel gear 66. As soon as the machine starts to operate, the cam 76 rocks the bell-crank lever 77 and exerts a pull in the link 24 (see Figures 1 and 2). This operates the arm 23 and rotates the vertical shaft 6 carrying the fruit holder 5. This swings the fruit holder inwardly, carrying the fruit into the position shown in Figure 2. As the fruit advances, its lower end is dragged across the disc cutter 19, which cuts off the stem end of the fruit. In this connection it should be understood that the arcuate blade 20 (see Figure 5) steadies the fruit while the stem end is being cut off.

As the arm 5 moves out over the opening 18 above the peeling mechanism 39, the cam 26 (see Figure 1) co-operating with the segment 25, permits the arm to descend considerably, so that the lower end of the fruit 3 will lie very near the peeling cutters 41. As the machine continues to operate, the cam 85 depresses the cam lever 81, thereby moving the carriage 79 downward on its guide 80 (see Figure 4). This brings the lower end of the pusher stem 40 into engagement with the flower end of the fruit and slowly forces the fruit downwardly over the guide plate 90. At the same time, the carriage 43 is being rotated by the pinion 61 (see Figure 4) so that the peeling cutters 41 rotate around the fruit. As this takes place, the cutters are pressed yieldingly against the face of the fruit through the operation of the springs 51 which are pulling up on the cutter frames pivoted at 50 on the carriage (see Figures 4 and 5).

The cam 58 operates as a variable means for controlling the position of the cutters 41 through the medium of the adjustable stop 60 resting on the toe 54 of each cutter frame 47. In this connection it should be understood that the position of the adjustable stop 60 is controlled through the medium of the rock-shaft 56 carrying the toe 57 running on the face of the cam 58.

After the removal of the peel is substantially completed, the cam 101 will have arrived at about the position in which this cam is indicated in Figure 4. This brings the "drop point" on the cam about opposite the roller 100 and permits the push rod 99 to be elevated by its spring 99ª. This causes the lever 96 to pull down on the guide plate 90 and thereby depresses the fruit which is held on the guide plate 90. This brings the flower end of the fruit into position to be peeled by the cutters 41 and immediately thereafter the cam 58 operates to withdraw the cutters 41 slightly from each other so as to permit the pusher stem 40 to descend and push the fruit down far enough on the plate 90 to completely cut through the core of the fruit, whereupon the halves of the fruit will fall by gravity through the tubular arbor 46.

The peel from the fruit may be collected in a chute 130 extending off to one side below the machine (see Figure 1).

When the cam-shaft 75 has completed one revolution, the pin 109 will strike the shoulder 108 (see Figure 3) and pull up on the draw rod 103, thereby opening the clutch 71 and stopping the machine.

It is understood that the embodiment of the invention described herein in only one of the many embodiments this invention may take, and we do not wish to be limited in the practice of the invention, nor in the claims, to the particular embodiment set forth.

What we claim is:

1. In a fruit peeling machine, the combination of a frame, peeling mechanism supported in the frame to rotate around an axis, a swinging holder for the fruit capable of assuming a position to receive the fruit out of line with the axis of rotation of the peeling mechanism, means for swinging the holder so as to bring the fruit into line with the said axis, and a knife in the path of the fruit as it swings from the receiving position toward the said axis, for automatically cutting off the stem end of the fruit as it is swung over.

2. In a fruit peeling machine, the combination of a frame, peeling mechanism mounted in the frame to rotate around a vertical axis, a pivoted fruit holder supported on the frame having means for cutting into the fruit to guide it and hold the same against rotation, and capable of assuming a position to receive the fruit out of line with the axis of rotation of the peeling mechanism, means for swinging the holder so as to bring the fruit into line with the said axis, and a pusher, with means for actuating the same to advance the fruit past the cutters.

3. In a fruit peeling machine, the combination of a frame, peeling mechanism mounted in the frame to rotate around a vertical axis, a pivoted fruit holder supported on the frame having means for engaging the fruit to hold the same, and capable of assuming a position of rest to receive the fruit out of line with the axis of rotation of the peeling mechanism, means substantially in line with the fruit holder when in said position of rest for cutting the flower end of the fruit, means for swinging the holder so as to bring the fruit into line with the said axis, and means for removing the stem end of the fruit as it is swung over into line with the said axis.

4. In a fruit peeling machine, the combination of a frame, peeling mechanism mounted in the frame to rotate around a vertical axis, a pivoted fruit holder supported on the frame having means for engaging the fruit to hold the same, and capable of assuming a position of rest to receive the fruit out of line with the axis of rotation of the peeling mechanism, means substantially in line with the holder in said position of rest for cutting the flower end of the fruit, means for swinging the holder so as to bring the fruit into line with the said axis, means for removing the stem end of the fruit as it is swung over into line with the said axis, and a pusher in line with the said axis with means for actuating the same to advance the fruit past the cutters.

5. In a fruit peeling machine, the combination of a frame, peeling mechanism mounted in the frame to rotate around a vertical axis, a cover on the frame having a central opening in line with the said axis, a swinging fruit holder supported on the frame, said fruit holder having means for cutting into the fruit to guide it and hold the same against rotation, and capable of assuming a position at one side of the cover to receive the fruit, means for swinging the holder so as to bring the fruit into position over the said opening and into line with the said axis, and a pusher with means for controlling the same to advance the fruit past the cutters.

6. In a fruit peeling machine, the combination of a frame, peeling mechanism mounted in the frame to rotate around a vertical axis, a cover on the frame having a central opening in line with the said axis, a swinging fruit holder supported on the frame, having means for engaging the fruit to hold the same and capable of assuming a position at one side of the cover to receive the fruit, means for swinging the holder so as to bring the fruit into position over the said opening and into line with the said axis and means co-operating with the holder for holding the fruit in a depressed position within and below said opening, and a pusher with means for controlling the same to advance the fruit past the cutters.

7. In a fruit peeling machine, the combination of a frame, peeling mechanism mounted in the frame to rotate around a vertical axis, a swinging fruit holder pivotally mounted on the frame, having means for engaging the fruit to hold the same, and capable of assuming a receiving position to receive the fruit out of line with the axis of rotation of the peeling mechanism, means for swinging the holder so as to bring the fruit into line with the said axis, and a cam co-operating with the fruit holder to cause the same to descend and hold the fruit in a depressed position near the peeling mechanism when the fruit moves into line with the said axis, and a pusher with means for controlling the same to advance the fruit past the peeling mechanism.

8. In a fruit peeling machine, the combination of a frame, peeling mechanism mounted to rotate about a substantially vertical axis, a pusher in the form of a stem mounted above the peeling mechanism and on its axis of rotation, means for guiding the pusher stem to move toward and from the peeling mechanism, a hand-controlled pivoted arm, means carried thereby for holding the fruit below the pusher stem and with its axis substantially coinciding with the axis of the stem, hand-controlled power actuated means for moving the pusher stem down to advance the fruit past the peeling mechanism, an automatic trip device for disconnecting the power driven mechanism to stop the operation of the pusher stem and the peeling mechanism after the fruit has been peeled, and a hand-controlled member for throwing the automatic tripping device into active position.

9. In a fruit peeling machine, the combination of a frame, peeling mechanism mounted to rotate about a vertical axis, a fruit holder having means for holding the fruit against rotation mounted to swing on an axis and capable of assuming a receiving position out of line with the peeling mechanism to receive the fruit, rotary means co-operating with the holder to remove the flower end of the fruit while the fruit holder is in its receiving position, power driven mechanism with means driven thereby to swing the holder on its axis from its receiving position, to bring the fruit into line with the peeling mechanism, and automatic means for advancing the fruit thereafter past the peeling mechanism.

10. In a fruit peeling machine, the combination of a frame, peeling mechanism mounted to rotate about a vertical axis, a fruit holder having means for holding the fruit against rotation mounted to swing on an axis and capable of assuming a receiving position out of line with the peeling mechanism to receive the fruit, means for engaging the flower end of the fruit for removing the flower end of the fruit while the fruit is held by the fruit holder against rotation, and in its receiving position, power driven mechanism with means driven thereby to swing the holder on its axis away from its receiving position to bring the fruit into line with the peeling mechanism, automatic means for advancing the fruit thereafter past the peeling mechanism, and automatic means for cutting off the stem end of the fruit as the holder swings the fruit over into line with the peeling mechanism.

11. In a fruit peeling machine, the combination of a frame, peeling mechanism mounted to rotate about a vertical axis, a fruit holder mounted to swing on an axis and capable of assuming a receiving position out of line with the peeling mechanism to receive the fruit, means substantially in line with the fruit holder in its receiving position for removing the flower end of the fruit while the fruit holder is in its receiving position, power driven mechanism with means driven thereby to swing the holder on its axis, away from its receiving position to bring the fruit into line with the peeling mechanism, automatic means for advancing the fruit thereafter past the peeling mechanism, and a rotary disc cutter mounted in the path of movement of the stem end of the fruit as the same is swung over with the holder, for removing the stem end of the fruit.

12. In a machine of the kind described, the combination of a frame, a rotary carriage mounted on said frame to rotate on an axis, a peeling cutter located adjacent the said axis, means for advancing the fruit along said axis past the cutter and toward the rotary carriage, a cutter frame carrying the peeling cutter, with means for pivotally supporting the same on the carriage to rock on an axis transverse to the first named axis and located on the carriage beyond the cutter with respect to the direction the fruit advances.

13. In a machine of the kind described, the combination of a frame, a rotary carriage mounted on said frame to rotate on an axis, a peeling cutter located adjacent the said axis, means for advancing the fruit along said axis past the cutter and toward the rotary carriage, a cutter frame carrying the peeling cutter, with means for pivotally supporting the same on the carriage to rock on an axis transverse to the first named axis and located on the carriage beyond the cutter with respect to the direction the fruit advances, means for yieldingly pressing the cutter frame in a direction to move the peeling cutter toward the fruit, and automatic means for variably limiting the movement of the cutter frame toward the fruit.

14. In a machine of the kind described, the combination of a frame, a rotary carriage mounted on said frame to rotate on an axis, a peeling cutter located adjacent the said axis, means for advancing the fruit along said axis past the cutter and toward the rotary carriage, a cutter frame carrying the peeling cutter, with means for pivotally supporting the same on the carriage to rock on an axis transverse to the first named axis and located on the carriage beyond the cutter with respect to the direction the fruit advances, means for yieldingly pressing the cutter frame in a direction to move the peeling cutter toward the fruit, and a cam driven at a different speed of rotation than the carriage, with means controlled by the cam to limit the movement of the cutter frame toward the fruit.

15. In a machine of the kind described, the combination of a frame, a rotary carriage mounted on said frame to rotate on an axis, a peeling cutter located adjacent the said axis, means for advancing the fruit along said axis past the cutter and toward the rotary carriage, a cutter frame carrying the peeling cutter, with means for pivotally supporting the same on the carriage to rock on an axis transverse to the first named axis and located on the carriage beyond the cutter with respect to the direction the fruit advances, means for yieldingly pressing the cutter frame in a direction to move the peeling cutter toward the fruit, a stop for limiting the swinging movement of the cutter frame toward the axis of rotation of the carriage, a cam mounted concentrically on the carriage with means for driving the same at a different speed than the carriage, and means for controlling the position of said stop by said cam.

16. In a machine of the kind described, the combination of a frame, a rotary carriage mounted on said frame to rotate on an axis, said carriage having a central opening through which the fruit may pass, a peeling cutter located adjacent the said axis of rotation, means for advancing the fruit along said axis past the cutter and through the said opening in the carriage, a cutter frame carrying the peeling cutter with means for pivotally supporting the same on the carriage to rock on an axis transverse to the first named axis and located on the carriage beyond the cutter with respect to the direction the fruit advances, and automatic means for controlling the position of the cutter frame as the fruit advances through the carriage.

17. In a machine of the kind described, the combination of a frame, a rotary carriage mounted on said frame to rotate on a substantially vertical axis, said carriage having a central opening to permit the fruit to pass downwardly, a peeling cutter located adjacent the said axis of rotation, means for advancing the fruit down past the cutter and through the said opening in the carriage, a cutter frame carrying the peeling cutter, with means for pivotally supporting the same at a point on the carriage below the cutter, so as to rock on an axis located at a low level and transverse to the first named axis, and automatic means for controlling the position of the cutter frame as the fruit advances past the cutter.

18. In a machine of the kind described, the combination of a frame, a rotary carriage mounted on said frame to rotate on a substantially vertical axis, and having a central opening to permit the fruit to pass downwardly, a cutter frame with means for pivotally supporting the same at a low level on the carriage, to rock on an axis transverse to the first named axis, a cutter carried by the cutter frame above the carriage and at the said opening, means for advancing the fruit along the axis of rotation of the carriage past the cutter and through the opening in the carriage, and automatic means for controlling the position of the cutter frame as the fruit advances.

19. In a machine of the kind described, the combination of a frame, a rotary carriage mounted on said frame to rotate on an axis and having a central opening to permit the fruit to pass along said axis and through the carriage, peeling cutters mounted before the opening and in a position to engage the fruit before it passes through the opening, cutter frames corresponding respectively to the cutters and having yokes with forks pivotally attached on the carriage to rock on an axis transverse to the first named axis and located beyond the cutters with respect to the direction of advance of the fruit, means for advancing the fruit along the axis of rotation of the carriage past the cutters and through the opening in the carriage, and automatic means for controlling the position of the cutter frames as the fruit advances.

20. In a machine of the kind described, the combination of a frame, a rotary carriage mounted on said frame to rotate on an axis and having a central opening to permit the fruit to pass through the carriage, peeling cutters on opposite sides of the said axis and located before the opening so as to engage the fruit as it passes through the carriage, cutter frames corresponding respectively to the cutters and having yokes with forks located on opposite sides of the said opening and pivotally supported on the carriage to rock on an axis transverse to the first named axis, means for yieldingly urging the cutter frames in a direction to press the cutters toward the axis of rotation of the carriage, means for advancing the fruit along the axis of rotation of the carriage past the cutters and through the opening in the carriage, and automatic means for controlling the position of the cutter frames as the fruit advances.

21. In a fruit peeling machine, the combination of a frame, peeling mechanism mounted in a frame to rotate around a vertical axis, a pivoted fruit holder supported on the frame having means for engaging the fruit to hold the same, and capable of assuming a position to receive the fruit out of line with the axis of rotation of the peeling mechanism, means for swinging the holder so as to bring the fruit into line with the said axis, a pusher, with means for actuating the same to advance the fruit past the cutters, means for swinging the holder so as to bring the fruit into line with the said axis, a cutter for removing the stem end of the fruit as it is swung over into line with the said axis, and means for engaging and steadying the stem end of the fruit when the stem end is being removed.

22. In a fruit peeling machine, the combination of a frame, a fruit holder pivotally mounted on the frame and having means for engaging the fruit to hold the same, a knife in the path of the fruit operating to cut off the stem end of the fruit when the holder is swung on its pivot, and an arcuate guide blade curved about the pivotal support of the holder as an axis, for engaging the fruit near its stem end to steady the same.

23. A fruit peeling device having a knife with a cutting edge for engaging the face of the fruit to remove the peel and having a knife in advance of the first named knife for removing protuberances on the face of the fruit.

24. A peeling device for peeling fruit, having a curved knife with a cutting edge for engaging the face of the fruit to remove the peel, and a curved knife engaging the face of the fruit in advance of the first named knife for removing protuberances on the face of the fruit.

25. A peeling device for peeling fruit, having a circumferential cutting edge for peeling the fruit and having a circumferential cutting edge for cutting the face of the fruit in advance of the first named cutting edge to remove protuberances on the face of the fruit.

26. A peeling device for peeling fruit, having a peeling knife in the form of a frustum of a cone, with a circumferential cutting edge for removing the peel of the fruit, and having a circumferential cutting edge for engaging the face of the fruit in advance of the peeling edge, for removing protuberances on the face of the fruit.

27. In a fruit peeling machine, the combination of a frame, a fruit holder pivotally mounted on the frame and having impaling blades for engaging the fruit to hold the same in a fixed position in the holder, said holder being capable of assuming a receiving position to receive the fruit impaled on the impaling blades, and a rest co-operating with the fruit holder in its receiving position for limiting the engaging movement of the fruit.

28. In a fruit peeling machine, the combination of a frame, a fruit holder pivotally mounted on the frame and having impaling blades for engaging the fruit to hold the same in a fixed position in the holder, said holder being capable of assuming a receiving position to receive the fruit impaled on the impaling blades, a rest co-operating with the fruit holder in its receiving position for limiting the engaging movement of the fruit, and an adjustable stop co-operating with the rest for regulating the position of the rest with respect to the fruit holder.

29. In a fruit peeling machine, a fruit holder consisting of an arm pivoted to swing on a substantially vertical axis, said holder having a receiving throat for the fruit with a pair of oppositely disposed substantially radially disposed impaling blades for engaging the fruit to hold the same substantially fixed in the holder.

30. In a fruit peeling machine, a fruit holder consisting of an arm pivoted to swing on a substantially vertical axis, said holder having a receiving throat for the fruit with a pair of oppositely disposed impaling blades for engaging the fruit to hold the same substantially fixed in the holder, a rest co-operating with the holder to limit the impaling movement of the fruit when placed in the said receiving throat, peeling mechanism, means for removing the arm to bring the fruit into alignment with the peeling mechanism, and means for advancing the fruit thereafter out of the holder and through the peeling mechanism.

31. In a fruit peeling machine, a fruit holder consisting of an arm pivoted to swing on a substantially vertical axis, said holder having a receiving throat for the fruit with a pair of oppositely disposed corrugated impaling blades for engaging the fruit to hold the same substantially fixed in the holder, the corrugations of said blades extending substantially parallel with the axis of rotation of the peeling mechanism, a rest co-operating with the holder to limit the impaling movement of the fruit when placed in the said receiving throat, peeling mechanism, means for moving the arm to bring the fruit into alignment with the peeling mechanism, and means for advancing the fruit thereafter out of the holder and through the peeling mechanism.

32. In a fruit peeling machine, the combination of a frame, rotary peeling mechanism mounted in the front of the frame to rotate on a substantially vertical axis, a vertical shaft back of the said peeling mechanism, a clutch on the said vertical shaft for driving the same, a cam shaft mounted in the frame, with cams, means actuated by the cams for controlling the peeling mechanism, and automatic means for opening the clutch after the cam shaft has made one revolution.

33. In a fruit peeling machine, the combination of a frame, rotary peeling mechanism mounted in the front of the frame to rotate on a substantially vertical axis, a vertical shaft back of the said peeling mechanism, a clutch on the said vertical shaft for driving the same, a cam shaft mounted in the frame, with cams, means actuated by the cams for controlling the peeling mechanism, an automatically operating trip device for opening the clutch after the cam shaft has made one revolution, and a hand-operated lever for moving the trip device to permit the clutch to close.

Signed at San Francisco, Calif., this 20th day of May, 1929.

HJALMAR GORANSON.
DAVID GORANSON.